June 17, 1958
F. A. MAILLY
2,839,056
DEVICE FOR ADMINISTERING AND TRANSFUSING
BLOOD, SERUMS, PLASMAS AND OTHER
MEDICINAL PREPARATIONS
Filed March 1, 1955
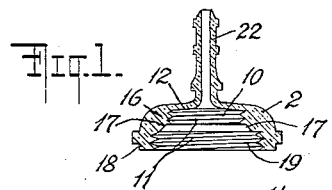
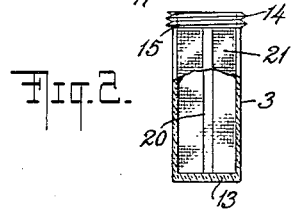
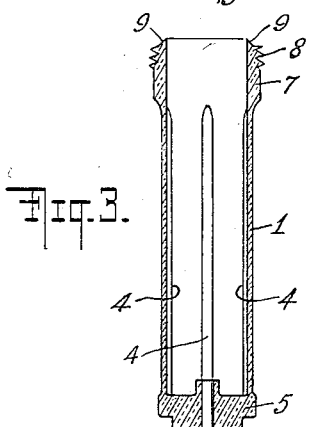
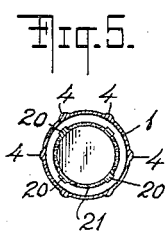
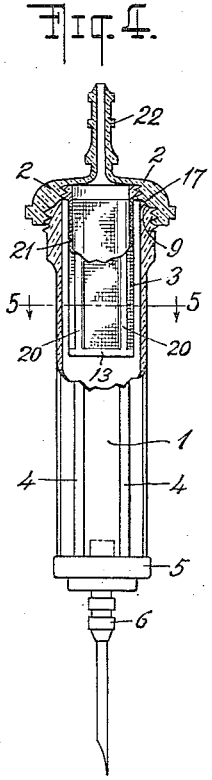
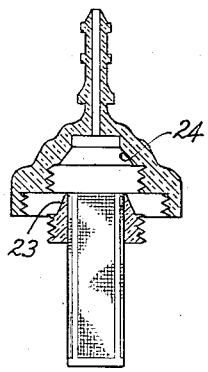
*INVENTOR.*
FÉLICIEN ALEXANDRE MAILLY
BY
*ATTORNEYS*

United States Patent Office 2,839,056
Patented June 17, 1958

2,839,056

DEVICE FOR ADMINISTERING AND TRANSFUSING BLOOD, SERUMS, PLASMAS AND OTHER MEDICINAL PREPARATIONS

Felicien Alexandre Mailly, Ermont, France, assignor to Etablissements Jouan S. A., Paris, France, a body corporate of France Application March 1, 1955, Serial No. 491,499

5 Claims. (Cl. 128—214)

This invention relates to a filter drip and related device for administering or transfusing blood, serums, plasmas, and liquid medicinal preparations to humans.

One object of the invention is to produce a non-fragile, non-metallic filter drip capable of being primed by squeezing the walls of the chamber thereof to establish the required fluid level in the chamber and permitting the observation of the flow of blood therethrough during administration of a blood transfusion.

Another object of the invention is to produce such a device without any metallic, glass, or rubber parts, made of a minimum number of parts, readily sterilizable by damp heat, stable both physically and chemically, leakproof under conditions of use, sufficiently transparent to observe the movement or feed of a medicament contained in the chamber, light in weight, flexible but strong, and resistant to breakage. The entire device is molded excepting for the filter fabric, including not only the main portion of the device but also screw threads, adapters, and seals.

The invention is illustrated in connection with a filter drip device for transfusing blood to humans.

In the drawings, Figs. 1, 2, and 3 represent a filter drip showing the chamber 1, its closure member 2, and filter 3 in unassembled relation. Fig. 4 is a partial longitudinal section of the assembled parts of Figs. 1, 2, and 3; Fig. 5 is a cross-section on line 5—5 of Fig. 4, and Fig. 5 is a modification of the filter and closure member.

The device comprises a chamber 1, a closure member 2 therefor, and a filter 3 adapted to be secured to the inner portion of the closure member 2. The chamber 1 is circular in cross-section and provided with a series of ribs 4 in spaced relation, running lengthwise of the chamber and located on the outside of the chamber in order that the internal surface of the chamber is smooth and unobstructed. The ribs 4, as shown in the drawing, are six in number and equally spaced about the outside of the chamber. The bottom of the chamber is closed by a bottom closure member 5 provided with an adapter 6 having a duct therein for feeding medicaments from the chamber to the hypodermic needle or other devices connected to the adapter.

The chamber 1 is provided with a collar 7 formed on the outside surface of the chamber leaving the inner surface thereof smooth and unobstructed. The collar 7 is provided with csrew threads 8 cooperating with related screw threads on the closure member 2 to secure them together. The upper edge of the chamber is provided with a continuous annular lip 9 arranged angularly in relation to the median line of the chamber. The closure member 1 is provided with a deep chamber 11, the inner surface whereof has a series of walls therein. The wall 12 is provided with the screw threads 10 which cooperate with the screw threads 14, formed in the collar 15 on the filter 3 whereby the filter is hung from the closure 2 when the device is in use. The wall 16 is provided with a continuous annular lip 17. Wall 18 is provided with the internal screw threads 19 adapted to engage the screw threads 8 and thereby unit the chamber and closure member.

The filter is illustrated in the drawings as an elongated sleeve, having a bottom plate 13 and the top collar 15 joined to the plate 13 by four upstanding ribs 20. The collar 15 carries the screw threads 14 molded therein. The filter material 21 is of a woven type secured to the plate 13, the collar 15, and ribs 20.

An adapter 22 is provided at the top wall of the member 2 for connection with a source of supply of the preparation to be transfused.

The entire device is molded from superpolyamide (nylon) made by condensation of adipic acid and hexamethylene diamine (DuPont's FM 1001) or by condensation of sebacic acid and hexamethylene diamine (DuPont's FM 3001). The chamber 1 and its several parts, including the collar 7 and screw threads 8, are molded in a single piece from nylon. The bottom closure 5 and its adapter 6 are molded in a single piece from nylon and secured by cement or fusion to the chamber 1. The closure member 2, including its screw threads, and the adapter are molded in a single piece from nylon. The filter parts are also molded from nylon, assembled by cementing or fusion and the filter material cemented in place.

When the three units—the chamber 1, closure member 2 and filter 3—are assembled, the filter hangs from the closure member with its interior in line with the duct of the adapter 22 and the closure member screwed to the chamber 1. The two lips 9 and 17 directly engage one another circumferentially and seal the joint between closure member and chamber. The angles of the lips 9 and 17 are preferably of slightly different pitch in order that they will interengage the inside of the extreme top edge of one of the lips. Inasmuch as the nylon lips 9 and 17 are thin and converge to a dull knife edge, they are sufficiently flexible as to permit them to flex as one directly engages the surface of the other and thereby form a tight nylon to nylon seal. In fact, the lips may be formed at the same angle, i. e., a 45° angle which will tend to cause the edges to initially interengage and as pressure is applied to the screw threads, seal the lips together.

The wall of the chamber 1 is not crystal clear as to transparency but when made thin to a thickness of about 0.001 inch is sufficiently transparent to observe the movement of blood in the chamber and during priming. Inasmuch as the chamber is substantially round in cross-section and reinforced at the top and bottom edges by the members 2 and 5 and by the ribs 4 when squeezed it will give and when released return to its original contour.

The entire device is light in weight, as shown in actual size in Figs. 1, 2, and 3, weighing but a few grams.

In Fig. 6, the upper edge of the filter frame is provided with a molded nylon lip 23 and a corresponding lip 24 formed during molding of the closure member. When the filter and closure member are screwed together, these lips 23 and 24, which are resilient, interengage and form a surface-to-surface nylon seal. These lips 23 and 24 are resilient in the same degree as the lips 9 and 17 and function in like manner.

I claim:

1. A device for administering blood transfusions to humans comprising a substantially circular elongated chamber, a bottom closure member, a chambered top closure member, said chamber and top closure member being formed of molded nylon, and a filter, the filter being suspended from the top of the top closure member, a collar on the chamber carrying external screw threads, internal screw threads in the chamber of the top closure member, the chamber and top closure member being secured together by the interengagement of said screw threads, the suspended filter depending into the chamber, the upper edge of the chamber having a sealing lip and the inner surface of the top closure member having a corresponding lip, said lips being formed of nylon and integrally molded with the particular member carrying the respective lips, the upper edges of said lips having relative flexibility and directly interengaging when the top closure member is secured to the chamber.

2. A device according to claim 1 wherein the wall of the chamber is provided with a series of ribs spaced circumferentially on said chamber.

3. A device according to claim 1 wherein the filter at its top edge is provided with screw threads and the inner wall of the top closure member is provided with corresponding screw threads to suspend the filter from said top closure member.

4. In a device for use in administering blood by transfusion, three separable units comprising a chamber, a top closure member and a filter frame, the top closure member having two sets of independent screw threads on the inner surface thereof, the filter frame having external screw threads at the top portion thereof, the chamber having screw threads at the top edge thereof, the screw threads on the filter frame engaging one set of the screw threads carried by the closure member, the screw threads on the chamber engaging the other screw threads on the closure member, an angular lip on the internal surface of the closure member positioned above the screw threads engaged by the screw threads on said filter frame, an angular lip on the filter frame positioned above the screw threads thereon, said angular lips directly engaging when the filter frame is screwed home into said closure member, the closure member, the chamber, the screw threads and lips being formed from molded nylon, the interengaging lips being the means for leakproof sealing of the filter frame to the closure member.

5. In a device for administering blood transfusions of the character set forth in claim 1, wherein the chamber is encircled by a wall made of molded nylon approximately 0.001 of an inch thick, the wall being flexible to permit priming of the device.

References Cited in the file of this patent

UNITED STATES PATENTS

| | | |
|---|---|---|
| 2,409,734 | Bucher | Oct. 22, 1946 |
| 2,571,059 | Puschelberg et al. | Oct. 9, 1951 |
| 2,696,818 | Van Loghen | Dec. 14, 1954 |